United States Patent

[11] 3,582,786

[72] Inventor Lucas Bruglemans
Antwerp, Belgium

[21] Appl. No. 731,018
[22] Filed May 22, 1968
[45] Patented June 1, 1971
[73] Assignee Automatic Electric Laboratories, Inc.
Northlake, Ill.

[54] TRANSMISSION CHECK IN DATA SYSTEM
6 Claims, 1 Drawing Fig.

[52] U.S. Cl. .......... 325/41, 235/153, 325/325, 340/146.1
[51] Int. Cl. .......... H04b 1/00
[50] Field of Search .......... 325/41, 325, 326; 178/23.1; 235/153

[56] References Cited

UNITED STATES PATENTS

| | | | |
|---|---|---|---|
| 2,121,163 | 6/1938 | Robinson | 178/23.1 |
| 3,228,000 | 1/1966 | Collis | 340/146.1 |
| 3,343,091 | 9/1967 | Bruglemans | 325/320 |
| 3,349,330 | 10/1967 | Wedmore | 325/320 |
| 3,402,389 | 9/1968 | Koontz | 325/41X |

*Primary Examiner*—Robert L. Griffin
*Assistant Examiner*—R. S. Bell
*Attorneys*—Spencer E. Olson, K. Mullerheim and B. E. Franz

ABSTRACT: A diphase signaling system wherein the signal equipment is arranged to send a confirming signal for every signal received and further having a small shift register connected to the sending and receiving equipment in such a way that it can be shifted in both directions. At the sending station, every time that a bit "1" is sent the register is shifted in a first direction. The receiving station upon detecting the bit "1" replies with an identical signal via the other path to the sending station, where this confirming signal is detected and applied to the shift register to erase the previously recorded bit. Upon the completion of the sending of data from the first to the second station and the receipt of a confirmation for each bit of data sent the shift register should be in a completely reset or empty state, indicative of the fact that the data sent was correctly received by the receiving station.

PATENTED JUN 1 1971 3,582,786
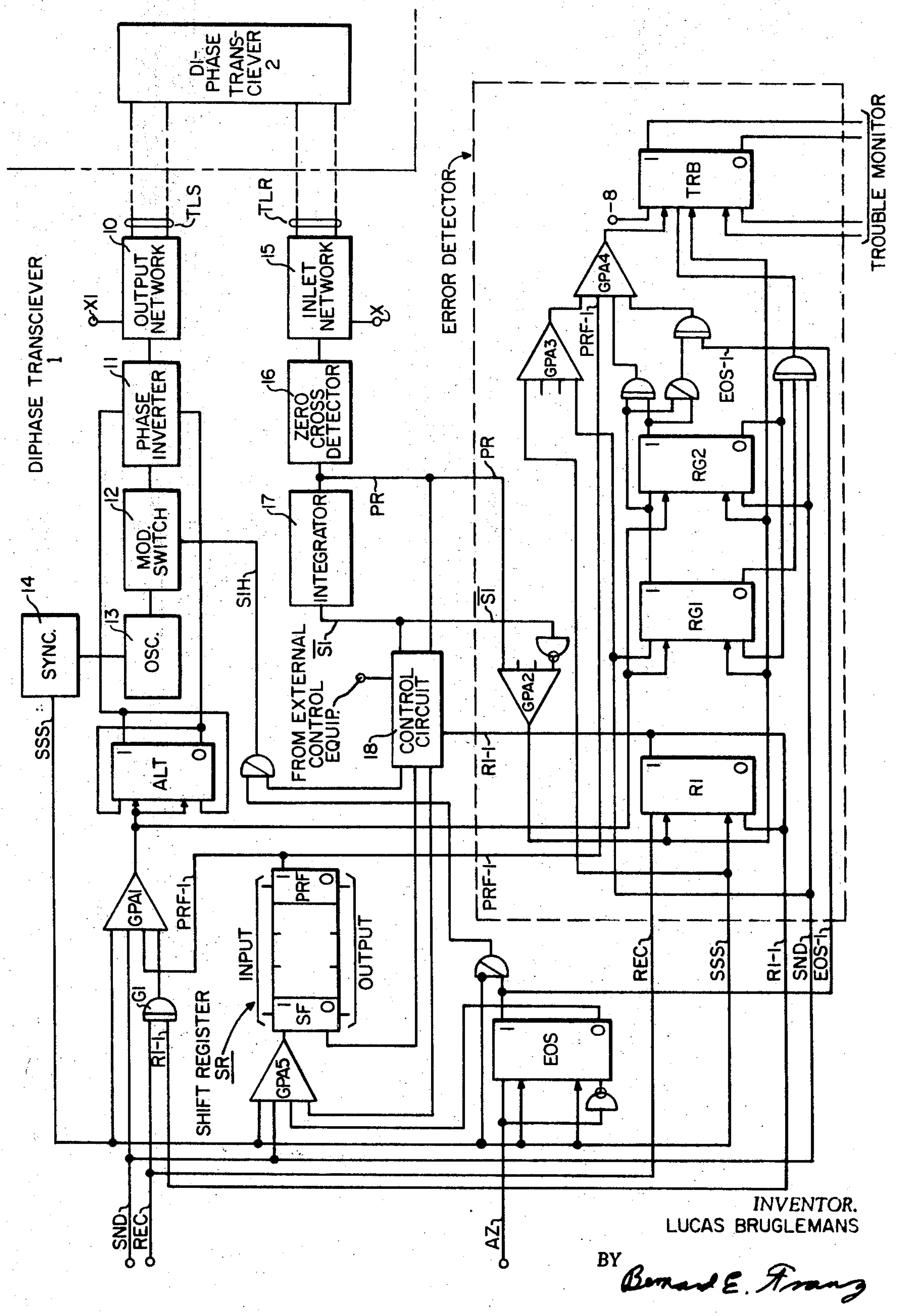
INVENTOR.
LUCAS BRUGLEMANS
BY Bernard E. Franz
ATTY.

TRANSMISSION CHECK IN DATA SYSTEM

BACKGROUND OF THE INVENTION

1. Field of the Invention

This invention relates to an electronic diphase transmission system, and more particularly to an error detection system using feedback from the receiving terminal to the sending terminal.

2. Description of the Prior Art

In one type of diphase transmission system, binary digital information is represented by a single cycle at the carrier frequency, with one binary value represented by a phase reversal at the beginning of a cycle, and the other binary value by a continuation of the same phase as the preceding cycle.

A diphase signaling system of this type is more fully described in the following two patents which are hereby incorporated by reference: U.S. Pat. No. 3,349,330, issued to W. R. Wedmore on Oct. 24, 1967 and U.S. Pat. No. 3,343,091, issued to the present applicant on Sept. 19, 1967.

However, in the above and similar data systems there is the possibility of an erroneous sending, distortion in transmission or even an error in receiving the information. In attempting to overcome these problems the prior art systems were designed to utilize a fixed pattern or format for the message. The body of the message was usually prefixed with a certain number of bits (binary digits), and the total number of bits in the message had to be an even or an odd quantity and be suffixed with certain bits. Every one of these expedients contributed to the overall reliability but did not provide a check on the data transmitted in that it was still possible for the omission or addition of a bit or bits to a message and still meet the tests of these systems.

The problems and advantages of these various approaches to error control in digital data transmission systems is more thoroughly explained in the book of R. K. Richards titled "Electronic Digital Systems" by John Wiley and Sons, Inc., 1966, Chapter 5, with special emphasis on the section starting on page 430titled "Feedback for Error Control".

SUMMARY OF THE INVENTION

The system according to the invention utilizes duplex transmission facilities wherein each of two transceiver terminals utilize one transmission path for sending and another for receiving. Each terminal, whether in the sending or the receiving state, is arranged to both send and receive simultaneously, utilizing one path for transmitting and the other path for receiving. The terminal in the receiving state is arranged to return a verification but via the second transmission path for each information bit it receives via the first path.

The transceivers each have in addition to the transmitting and receiving apparatus a binary counter operated to advance its count for each bit transmitted, when in a sending state, and to decrease the count with each verification bit received. This counter is thus effective to indicate a faulty condition of either one of the terminals or transmission paths, when it is advanced in response to data sent, but is not reset because of a lack of verification bits being received. Thus, when the counter is advanced to a predetermined count it can be arranged to operate an alarm indicative of this condition.

BRIEF DESCRIPTION OF THE DRAWING

The novel feature which is believed to be characteristic of the invention, both as to its organization and method of operation, will be more apparent from the following detailed description, taken in conjunction with the drawing, the single figure of which is a schematic and functional block diagram of the preferred embodiment of the transceiver in a network incorporating the novel transmission checking feature.

DESCRIPTION OF THE PREFERRED EMBODIMENT

Electronic logic used in the system described herein employ as standard building blocks NOR gates, inverters, flip-flops and gated pulse amplifiers, among others. The gates are shown on the drawing, however, as AND gates, OR gates or inverters for ease in reading the drawing. The flip-flops as shown on the drawing do not have the coincidence gates shown for the inputs; these are to be understood as being contained within the boxes representing the flip-flops. To differentiate between the DC and AC inputs, the AC inputs are shown with an arrowhead. Except for these differences, the description given in the referenced patents applies to the drawing of the application.

Referring to the drawing, the system includes a diphase transceiver 1, and a similar diphase transceiver 2. The transceivers are connected by a four-wire transmission line in which pair TLS is for sending from transceiver 1 to transceiver 2, and pair TLR is for receiving at transceiver 1 from transceiver 2. It should be noted that the transceiver is part of a system which includes control circuits (which will be referred to as external control circuits) to supply the command signals to the transceiver, and to provide parallel input and output for the shift register. The basic diphase transceiver equipment comprises a synchronizer 14, an oscillator 13, a modulator switch 12, a phase inverter 11, and an output network 10 for the transmitting side. The receiving portion consists of an inlet network 15, a zero crossing detector 16 and an integrator circuit 17. This equipment is similar to that shown in the referenced U.S. Pat. Nos. 3,349,091and 3,343,330,which may be referred to for the details not shown here. The oscillator 13 serves to supply a sine wave signal to the modulator and to the synchronizer 14 which applies to lead SSS a pulse train comprising one pulse per sine wave cycle. The modulator switch 12 serves as a gate to permit the passage of the basic carrier frequency to the phase inverter 11 when enabled by a signal on lead SIH. The phase inverter operates in response to the signals from flip-flop ALT to pass the carrier frequency of either a direct or inverted phase. The carrier signal is then passed through the output network 10 to the transmission line pair TLS.

That portion of the control equipment associated with the transceiver that is shown consists of a shift register SR, control circuit 18, flip-flop EOS, and associated gating circuits. For the immediate control of the diphase sending equipment there is an ALT flip-flop, which is driven from the shift register, to control the shift in phase of the transmitted signal.

The error detector circuit is shown within the broken lines of the drawing and consists of a receive flip-flop R1, register flip-flops RG1 and RG2, plus a trouble recording flip-flop TRB and the associated gating circuits.

To transmit, a signal on lead SND from the external control equipment is set "true." The pulses on lead SSS are being generated continuously, during both the transmission and reception of data, and are supplied to the input of the gated pulse amplifier GPA1 which supplies the operating current pulses to the flip-flop ALT. With the signal on lead SND "-true" and in conjunction with the external control circuits and the flip-flop EOS in the reset condition the shift register SR is supplied with shifting pulses. It is assumed that the external control equipment has loaded the shift register prior to signaling the transceiver to prepare for transmission by forwarding the SND signal. The signals shifted out of the shift register SR are coupled via lead PRF1 to the gated pulse amplifier GPA1 to cause flip-flop ALT to change state in response to each bit "1" from the shift register. This causes the output of the modulator switch 12 and phase inverter 11 to reverse phase in response to each bit "1" and to remain in the preceding phase for each bit "0." When all of the information has been shifted out of the shift register, all of its flip-flops are in the reset condition, from which the external control equipment derives an all-zero signal AZ. The end-of-send flip-flops EOS is set by the AZ signal on the next pulse on lead SSS, and causes the removal of the SND signal to thereby cutoff the shift pulses from the gated pulse amplifier GPA5.

The received signals from the other transmitter come in on pair TLR to the inlet network 15, and from there to the zero crossing detector 16. The integrator derives from the signal on lead RP, an inverted signal on lead $\overline{S1}$. Signal $\overline{S1}$ appears whenever there is a phase reversal in the signal on the transmission line, representing a bit "1." This signal is the basic signal for supplying a DC set signal via control circuit 18 to the shift register SR. The signals on lead $\overline{S1}$ and PR are gated through GPA2 and used to set flip-flop R1 (return 1), whose output is then taken to drive the shift register SR. In addition to this basic operation, the control circuitry shown includes means to check the accuracy of the transmitted information.

To initiate transmission, the sending station (here assumed to be diphase transceiver 1) must send a continuous diphase signal consisting of all zeros to the receiving station diphase transceiver 2. Upon receipt of this, the receiving station answers with a similar continuous wave signal over the other transmission pair TLR, indicating that it is ready to receive. After receipt of the continuous signal from the receiving station, the receiving station continues to send the continouous wave signal. This continuous wave signal informs the sending station that it is still connected. After sending the first bit of data, the transmitting station sends all zeros, which enables the data to be shifted to the correct location in the register of the receiving station. The receiving station next returns a bit to the transmitting station. This checking transmission is controlled by a pair of flip-flops RG1 and RG2 which are interconnected in such a manner that they may be set sequentially in either direction. During transmission, every time flip-flop ALT is triggered a "1" is shifted to the register RG1, RG2. Upon detection of the bit "1" returned from the receiving station signal $\overline{S1}$ will appear. This causes a zero to be shifted in the register RG1, RG2, to in effect erase "1" registered during the transmission of the bit "1." Upon the completion of sending, from the sending to the receiving station, the number of "1'a" sent is equal to the number of "1's" returned. In this case the flip-flops RG1, RG2 are both reset, indicating a proper transmission and verification.

In detail this operation proceeds as follows: the external control equipment impresses a signal on lead X1 to the output network 10 causing it to transmit a continuous sequence of zeros to the receiving terminal via the transmission medium. The receiving terminal at transceiver 2, if it is in condition to receive, responds by a similar continuous sequence of zeros which is received at this sending station at inlet network 15. This continuous sequence of zeros at the inlet network activates a signal detector to put out a signal on lead X for use by the external control equipment. The external control equipment, upon receipt of the X signal, enables the control circuit 18 to start the driving means to pulse the first bit out of the shift register SR. A data bit "1" along with the synchronizing pulses SSS and the SND signal enable the gated pulse amplifier GPA1 to change the ALT flip-flop to its alternate position which will cause the phase inverter 11 to invert its phase, indicative of the transmission of a bit "1". The output of GPA1 that drives flip-flop ALT to its alternate position serves also to set flip-flop RG1 to register the transmission of a bit "1." The receiving equipment at diphase transceiver 2 must now return a confirmation bit "1" via the TLR path.

Upon receipt of this bit "1" signal in confirmation, signals RP and $\overline{S1}$ appear at inverter G2 to enable GPA2 which, with RG2 in the reset state, serves to reset flip-flop RG1.

As will be evident, it is necessary for RG2 to be in the reset state before the returned bit will reset RG1. When this is not true, that is, when two bits were transmitted before a confirmation bit is received, RG2 will also be in the set state. Under these conditions the confirmation bit received will first reset flip-flop RG2 in response to the combination of the RP and $\overline{S1}$ signals along with the presence of a set signal on lead SND indicating that the system is still in the sending state. If a third information bit were transmitted without having in the interim received a confirmation bit, this would be an indication of a fault in the system, and cause the trouble indicating flip-flop TRB to be set.

Other conditions operative to set flip-flop TRB are the system being in a send state as indicated by the presence of a signal on set lead SND, or a bit being present in the PRF flip-flop of the shift register when flip-flops RG1 and RG2 are set along with the signal SSS. This could occur if the system were not reset after a previous erroneous transmission or an incompleted verification of a previous transmission.

Another possibility to set flip-flop TRB is the system being in a send state indicated by the set signal on lead SND, and the receipt of a bit via the confirmation channel prior to the transmission of such a bit. The receiving terminal has equipment that is the same as disclosed for the transmitting terminal. The operation during transmission of data is, of course, the same as just described. During reception of data the operation is as follows: A continuous sequence of zeros at the receiving inlet network activates a signal detector to place a signal on lead X. This signal is used by the external control equipment to place a set signal on the REC lead indicating that the terminal is now in a receiving state. This, through logic not here shown, is operative to impress a signal on lead X1 to return a continuous sequence of zeros to the sending station. The sending terminal next responds with the first information bit, normally a prefix bit "1". This bit "1" upon being received at the receiving terminal causes the simultaneous presence of the RP and $\overline{S1}$ signals to be applied to the gated pulse amplifier GPA2. This combination of signals results in an output from GPA2, which along with the REC set signal, sets flip-flop R1 to control the input to the shift register SR. The set R1 output combined with the lead REC set signal at G1 along with the SSS signal enables the gated pulse amplifier GPA1 to change the ALT flip-flop to cause the phase inverter 11 to return a bit "1" to the sending station. This action will continue for each "1" bit received at the receiving terminal. The receiving terminal will remain in the receiving state until the sending receiving terminal terminates the sending of the continuous sequence of zeros following a transmission.

It will be apparent that applicant has provided an improved data transmission verification system in which the data sent is verified bit by bit. Various changes and alternative implementations will now occur to those skilled in the art without departing from the true spirit and scope of the invention.

Accordingly, it is not intended that the invention be limited to that which has been particularly shown and described, except as such limitations appear in the appended claims.

I claim:

1. In a system for transmitting data in a binary system of notation in which two transceivers are connected by a first and a second pair of transmission lines, each said transceiver including means for generating a carrier signal, synchronizing means for generating synchronizing pulses, modulating means, demodulating means, a shift register and a common control means; means for placing a first one of said transceivers in a send mode in which its synchronizing pulse drive its shift register to operate its modulating means so that a transmitter carrier signal is modulated in accordance with the data from its shift register and applied to said first pair of transmission lines, means for placing the other one of said transceivers in a receive mode in which its demodulating means is operated in response to the synchronizing pulses and said modulated signal received via said first pair of transmission lines to serially transfer into its associated shift register the derived data; a binary counter in said first transceiver, simultaneously responsive to said transmitted data signal and to said received confirmation data signal and operated to increment a count for each data bit shifted from said shift register and binary means at said other transceiver actuated to operate said associated modulator to return a confirmation bit via said second pair of transmission lines for each bit transferred into its associated shift register, said demodulator at said first one of said transceivers operated in response to said confirmation bit and its synchronizing pulses to operate said binary counter to decrement a count for each confirmation bit, whereby upon completed transmission and confirmation reception of data said counter is in its original state.

2. Apparatus in accordance with claim 1 further including a trouble recording means operated in response to said counter advancing to a predetermined count indicative of the number of data bits transmitted exceeding the number of confirmation bits received.

3. Apparatus in accordance with claim 1 wherein said binary counter at said first transceiver comprises first and second bistable devices, so arranged that said first device is placed in a second set state in response to a first set pulse and said second device is placed in a second set state in response to a second set pulse, said set pulses each corresponding to a data bit shifted from said shift register.

4. Apparatus in accordance with claim 3 wherein said binary counter is further arranged to return said second device to said first stable state in response to a first reset pulse and to return said first device to said first stable state in response to a second reset pulse, said reset pulses each corresponding to a confirmation bit received via said second pair of transmission lines.

5. Apparatus in accordance with claim 4 further including trouble recording means, and means operative in response to the set condition of said first and second bistable devices during sending and the presence of a reset pulse to set said trouble recording means.

6. Apparatus in accordance with claim 4 further including trouble recording means and means operative in response to the set condition of either said first or second bistable device during sending and the receipt of an end of message signal from said common control means to set said trouble recording means.